United States Patent
Lee et al.

(10) Patent No.: US 8,280,095 B2
(45) Date of Patent: Oct. 2, 2012

(54) MOBILE APPARATUS INCLUDING SPEAKER IN SEALED SOUND SPACE, AND METHOD OF ASSEMBLING THE MOBILE APPARATUS

(75) Inventors: Dong-il Lee, Seongnam-si (KR); Boo-sang Kim, Suwon-si (KR); Cheul-hae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1624 days.

(21) Appl. No.: 11/657,562

(22) Filed: Jan. 25, 2007

(65) Prior Publication Data

US 2008/0025542 A1  Jan. 31, 2008

(30) Foreign Application Priority Data

Jul. 27, 2006  (KR) .................. 10-2006-0070890

(51) Int. Cl.
  *H04R 1/02* (2006.01)
(52) U.S. Cl. ........ 381/386; 381/335; 381/345; 381/354; 381/371; 381/392; 379/433.02
(58) Field of Classification Search .................. 381/345, 381/335, 354, 371, 386, 392; 379/428.01, 379/433.01–440; 455/575.1
  See application file for complete search history.

(56) References Cited

U.S. PATENT DOCUMENTS

| | | | | |
|---|---|---|---|---|
| 2,607,857 A | * | 8/1952 | Baker ....................... | 379/433.01 |
| 3,457,375 A | * | 7/1969 | Haggerty ................... | 381/322 |
| 3,580,988 A | * | 5/1971 | Orlowski et al. .......... | 174/153 G |
| 4,072,829 A | * | 2/1978 | Ogihara ..................... | 381/392 |
| 4,173,715 A | * | 11/1979 | Gosman ...................... | 381/382 |
| 4,977,975 A | * | 12/1990 | Lazzeroni et al. .......... | 181/129 |
| 4,979,586 A | * | 12/1990 | Lazzeroni et al. .......... | 181/129 |
| 5,790,679 A | * | 8/1998 | Hawker et al. ............. | 381/163 |
| 5,982,882 A | | 11/1999 | Kasbekar et al. | |
| 6,553,119 B1 | | 4/2003 | Mori | |
| 6,668,063 B2 | * | 12/2003 | Cimaz et al. ............... | 381/345 |
| 7,395,095 B2 | * | 7/2008 | Schrack ..................... | 455/569.1 |
| 7,505,602 B2 | * | 3/2009 | Eaton ......................... | 381/351 |
| 7,508,933 B2 | * | 3/2009 | Yang .......................... | 379/433.02 |
| 7,567,680 B2 | * | 7/2009 | Murray et al. .............. | 381/181 |
| 7,664,539 B2 | * | 2/2010 | Noma et al. ................ | 455/575.1 |
| 7,796,773 B2 | * | 9/2010 | Klein .......................... | 381/351 |
| 7,796,779 B1 | * | 9/2010 | Strong et al. ............... | 382/100 |
| 2004/0156523 A1 | | 8/2004 | Tuason et al. | |
| 2005/0130716 A1 | * | 6/2005 | Shin et al. .................. | 455/575.1 |
| 2006/0067557 A1 | | 3/2006 | Imamura | |

FOREIGN PATENT DOCUMENTS

| EP | 0595514 | 10/1993 |
|---|---|---|
| EP | 0 978 978 | 2/2000 |
| WO | WO 00/76183 | 12/2000 |

\* cited by examiner

*Primary Examiner* — Curtis Kuntz
*Assistant Examiner* — Ryan Robinson
(74) *Attorney, Agent, or Firm* — Jefferson IP Law, LLC

(57) ABSTRACT

A mobile apparatus includes a main body; a wall forming part of an enclosure forming a sound space in the main body, the wall having an opening therein; a speaker disposed in the sound space; a signal line connected to the speaker and passing through the opening in the wall; and an opening sealing member that seals the opening in the wall through which the signal line passes.

26 Claims, 5 Drawing Sheets

MOBILE APPARATUS INCLUDING SPEAKER IN SEALED SOUND SPACE, AND METHOD OF ASSEMBLING THE MOBILE APPARATUS

CROSS-REFERENCE TO RELATED APPLICATIONS

This application claims the benefit of Korean Patent Application No. 2006-70890 filed on Jul. 27, 2006, in the Korean Intellectual Property Office, the disclosure of which is incorporated herein by reference in its entirety.

BACKGROUND OF THE INVENTION

1. Field of the Invention

An aspect of the invention relates to a mobile apparatus, and more particularly to a mobile apparatus provided with a sound space inside a main body of the mobile apparatus.

2. Description of the Related Art

A speaker system is installed in a mobile apparatus such as a communication terminal device, a gaming device, a multimedia apparatus, and the like. In particular, a speaker system with high fidelity is installed in a multimedia apparatus, such as an MP3 player or the like, having a sound reproducing function to enable the user to listen to music or audio without using earphones or headphones.

SUMMARY OF THE INVENTION

To enhance the sound quality of a speaker, it is necessary that a sound space in which a speaker is installed is completely sealed except for a sound emitting port. An aspect of the invention relates to providing such a sealed sound space.

An aspect of the invention provides a mobile apparatus having a structure that enables a sound space inside a main body of the mobile apparatus to be sealed effectively.

In accordance with an aspect of the invention, a mobile apparatus includes a main body; a wall forming part of an enclosure forming a sound space in the main body, the wall having an opening therein; a speaker disposed in the sound space; a signal line connected to the speaker and passing through the opening in the wall; and an opening sealing member that seals the opening in the wall through which the signal line passes.

In accordance with an aspect of the invention, the opening sealing member may be an elastic member.

In accordance with an aspect of the invention, the opening sealing member may have a through hole therein; the signal line may pass through the through hole in the opening sealing member without leaving any gap between the signal line and the opening sealing member; and the opening sealing member may be disposed in the opening in the wall.

In accordance with an aspect of the invention, a mobile apparatus includes a first cover; a speaker; a second cover joined to the first cover and including a plurality of walls and a back, the plurality of walls and the back forming a sound space around the speaker together with the first cover; and a first sealing member interposed between the first cover and the plurality of walls to seal gaps between the first cover and the plurality of walls.

In accordance with an aspect of the invention, the mobile apparatus may further include a second sealing member interposed between the speaker and the first cover to seal gaps between the speaker and the first cover.

In accordance with an aspect of the invention, one of the plurality of walls may have an opening therein; the mobile apparatus may further include a signal line connected to the speaker and passing through the opening in the one of the plurality of walls; and an opening sealing member that seals the opening in the one of the plurality of walls through which the signal line passes.

In accordance with an aspect of the invention, the opening sealing member may have a through hole therein; the signal line may pass through the through hole in the opening sealing member without leaving any gap between the signal line and the opening sealing member; and the opening sealing member may be disposed in the opening in the one of the plurality of walls.

In accordance with an aspect of the invention, the opening in the one of the plurality of walls may be a slot having a closed end, and an open end opening toward the first cover; and during assembly of the mobile apparatus, the opening sealing member may be positioned on the first cover, the second cover may be joined to the first cover, and the opening sealing member may be inserted into the slot as the second cover is being joined to the first cover.

In accordance with an aspect of the invention, a portion of the opening sealing member may include a rounded portion contacting the closed end of the slot; and the closed end of the slot may have a rounded shape matching a shape of the rounded portion of the opening sealing member contacting the closed end of the slot.

In accordance with an aspect of the invention, the mobile apparatus may further include a first sound emitting port that emits front sound of the speaker and is provided in the first cover; and a second sound emitting port that emits rear sound of the speaker and is provided in the first cover.

In accordance with an aspect of the invention, the mobile apparatus may further include a sound path enclosure that provides a sound path between the sound space and the second sound emitting port.

In accordance with an aspect of the invention, a mobile apparatus includes a main body; an enclosure forming a sound space in the main body; a speaker in the sound space; a first sound emitting port that communicates with the sound space and emits front sound of the speaker; and a second sound emitting port that communicates with the sound space and emits rear sound of the speaker; wherein the sound space is completely sealed without using a curable sealing agent except where the sound space communicates with the first sound emitting port and the second sound emitting port.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and/or advantages of the invention will become apparent and more readily appreciated from the following description of embodiments of the invention, with the accompanying drawings of which.

DETAILED DESCRIPTION OF THE EMBODIMENTS

Figure 1:
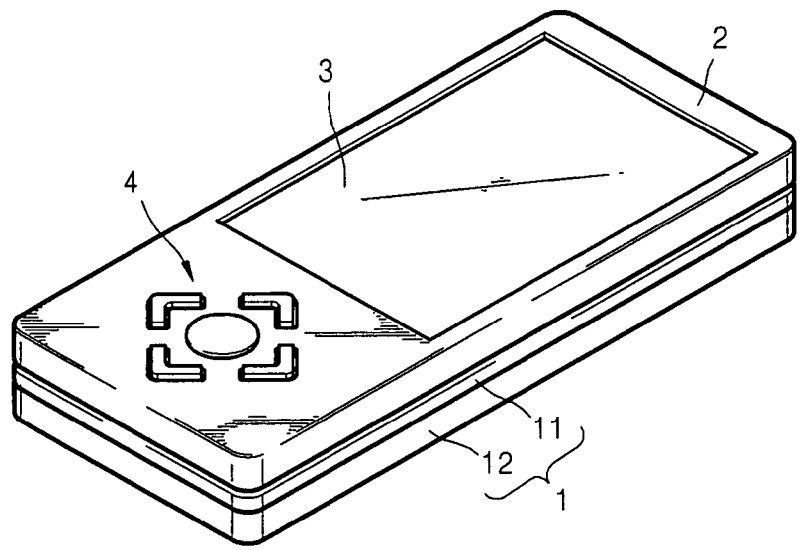
FIG. 1 is a perspective view of a mobile apparatus according to an aspect of the invention in a compact state in which a movable body is positioned to overlap a main body.

Reference will now be made in detail to embodiments of the invention, examples of which are shown in the accompanying drawings, wherein like reference numerals refer to like elements throughout. These embodiments are described below in order to explain the invention by referring to the figures.

Figure 2:
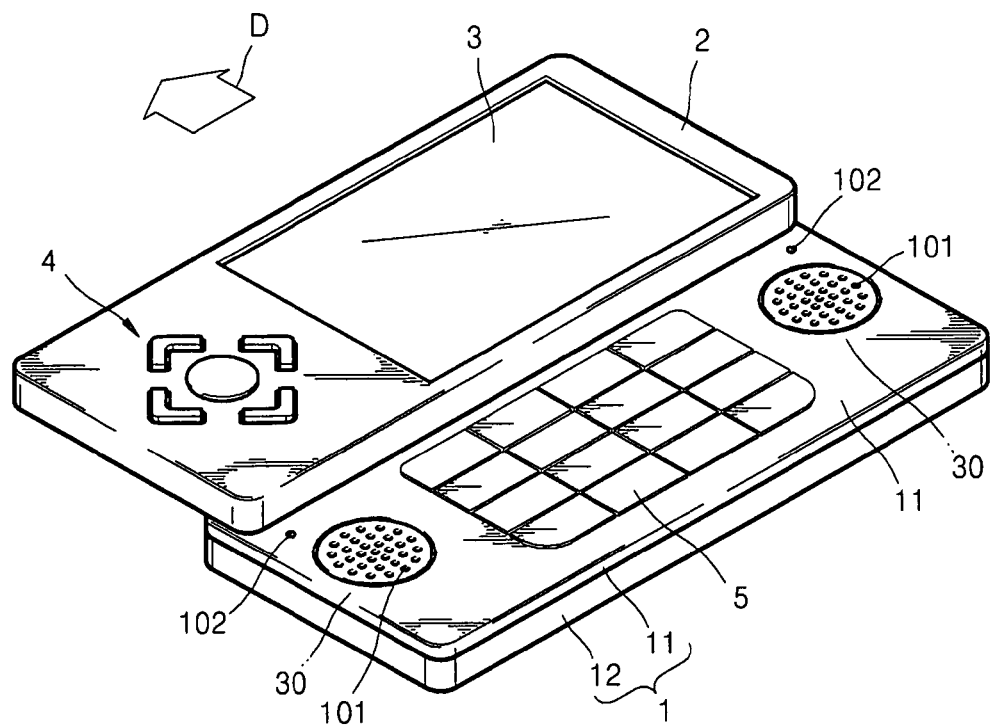
FIG. 2 is a perspective view of the mobile apparatus shown in FIG. 1 according to an aspect of the invention in a state in which the movable body has been slid with respect to the main body.
Figure 3:
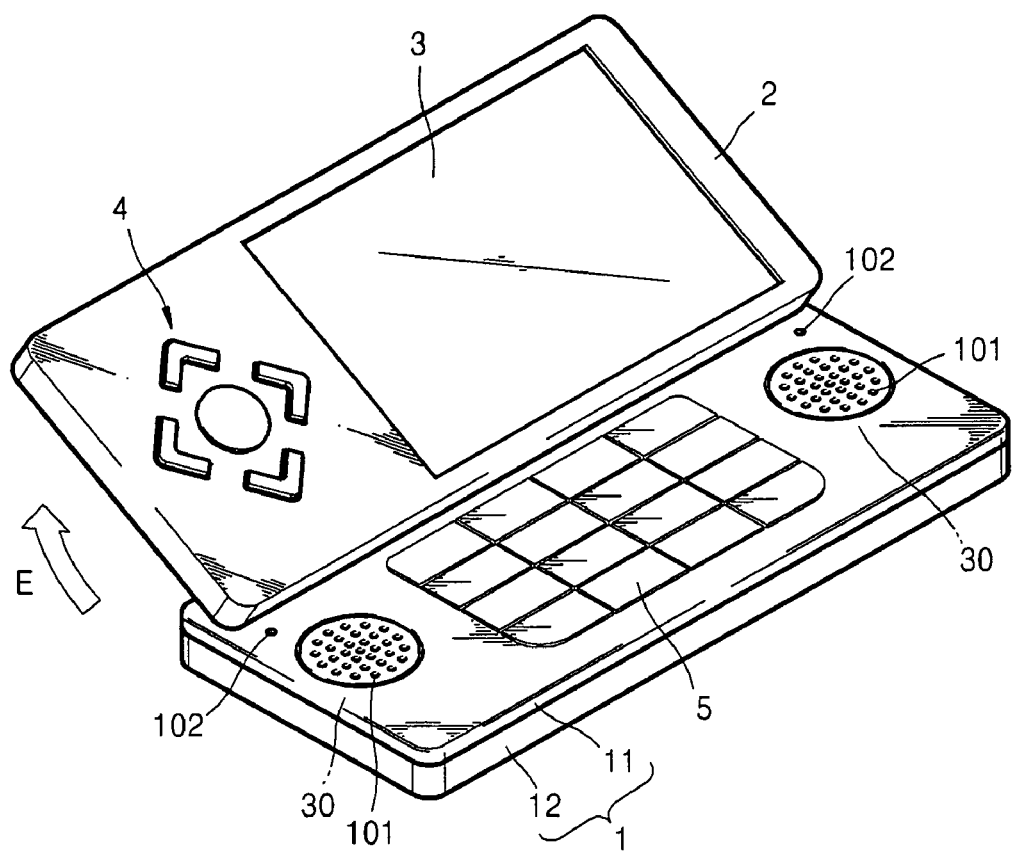
FIG. 3 is a perspective view of the mobile apparatus shown in FIG. 1 according to an aspect of the invention in a state in which the movable body has been tilted with respect to the main body after being slid as shown in FIG. 2.

FIGS. 1 through 3 are perspective views of a mobile apparatus according to an aspect of the invention in different states. The mobile apparatus shown in FIGS. 1 through 3 is a multimedia apparatus having a moving picture reproducing function and/or a sound reproducing function.

Referring to FIGS. 1 through 3, the mobile apparatus includes a main body 1 and a movable body 2. As shown in FIG. 1, the mobile apparatus can be carried by a user in a compact state in which the movable body 2 is positioned to overlap the main body 1. The movable body 2 can be slid in the direction of arrow D as shown in FIG. 2, and then can be tilted in the direction of arrow E as shown in FIG. 3. Although not shown in the drawings, the mobile apparatus includes sliding and tilting devices for maintaining the movable body 2 at the positions shown in FIGS. 1 through 3. A display unit 3 is provided in the movable body 2. For example, operation information of the mobile apparatus, video content, and the like can be displayed on the display unit 3. An operation unit 4 may be provided in the movable body 2. The operation unit 4 includes operation keys and the like for operating the mobile apparatus. The user can operate the mobile apparatus using the operation unit 4 while confirming operation information displayed on the display unit 3. Also, various video content can be viewed on the display unit 3.

Speakers 30 are provided in the main body 1. Reference numeral 101 denotes first sound emitting ports that emit front sound of the speakers 30. "Front sound" refers to sound energy that is radiated from the front side of the speakers 30. Reference numeral 102 denotes second sound emitting ports that emit rear sound of the speakers 30. "Rear sound" refers to sound energy that is radiated from the rear side of the speakers 30. Although not shown in the drawings, the user can also listen to audio content using earphones or headphones connected to a suitable connector provided in the main body 1 or the movable body 2. In addition, another operation unit 5 can be provided in the main body 1.

Figure 4:
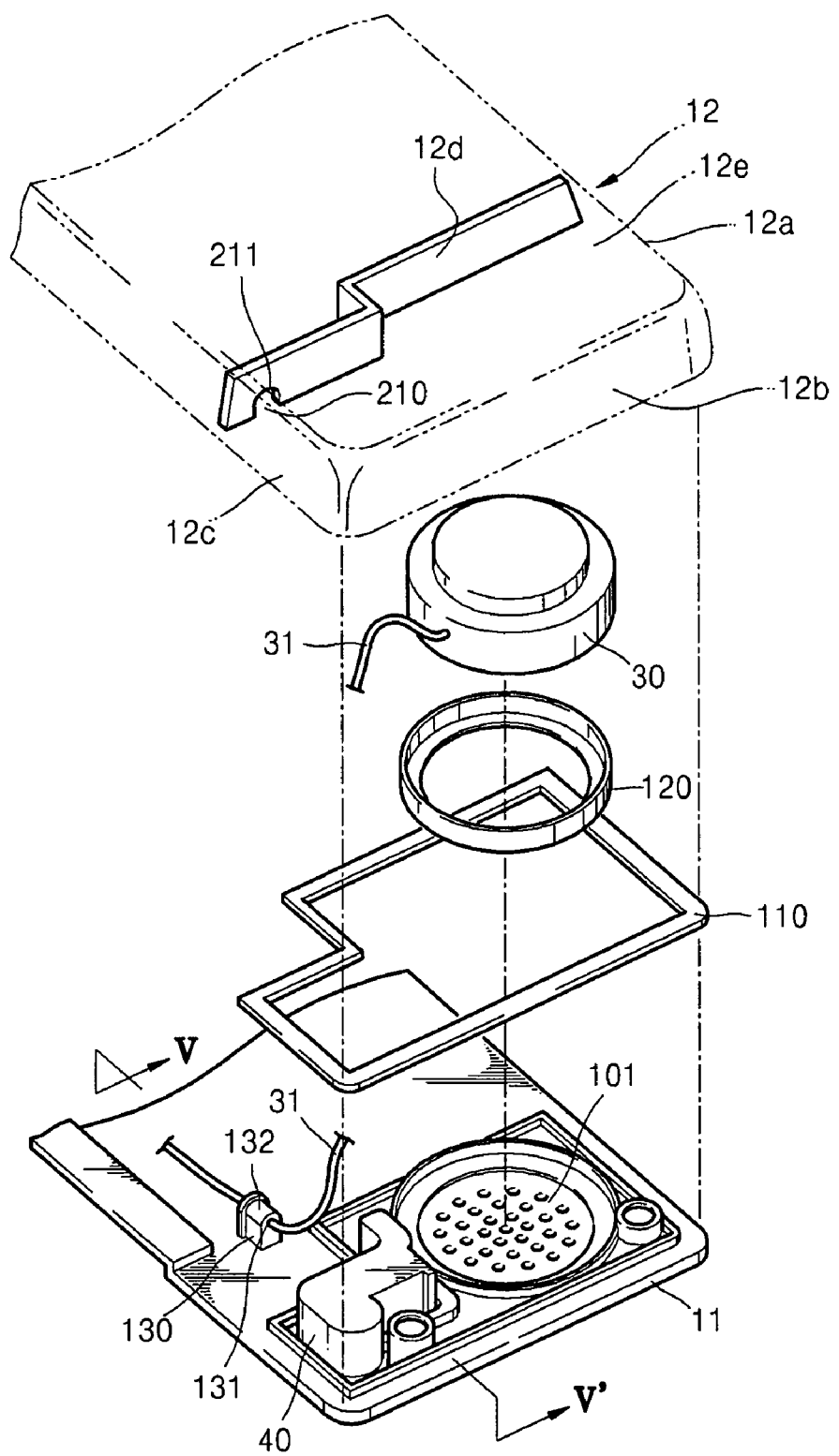
FIG. 4 is a partial exploded perspective view of the main body of the mobile apparatus shown in FIG. 1 according to an aspect of the invention.
Figure 5:
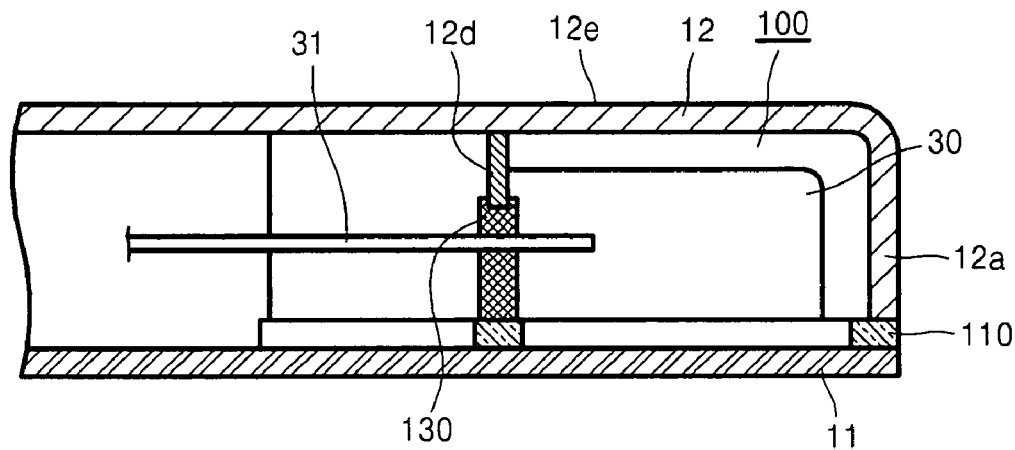
FIG. 5 is a partial cross-sectional view of the mobile apparatus shown in FIG. 1 according to an aspect of the invention taken along the line V-V' in FIG. 4.

FIG. 4 is a partial exploded perspective view of the main body 1 of the mobile apparatus shown in FIG. 1 according to an aspect of the invention, and FIG. 5 is a partial cross-sectional view of the mobile apparatus shown in FIG. 1 according to an aspect of the invention taken along the line V-V' in FIG. 4. The mobile apparatus according to an aspect of the invention includes a sound space 100 provided around each of the speakers 30. The first sound emitting port 101 is provided on a first cover 11. A speaker 30 is installed in the main body 1 in contact with the first cover 11 so that the front surface of the speaker 30 faces the first sound emitting port 101. An inner wall 12d in the shape of a rib is provided on a second cover 12 as part of an enclosure forming the sound space 100. Alternatively, the inner wall 12d may be provided on the first cover 11.

When the first and second covers 11 and 12 are joined to each other, the sound space 100 is formed around the speaker 30 by an enclosure formed by the first cover 11, outer walls 12a, 12b, and 12c of the second cover 12, the inner wall 12d, and a back 12e of the second cover 12. Since the speaker 30 is positioned closer to one edge of the first cover 11 than to an opposite edge of the first cover 11 as shown in FIG. 4, the outer walls 12a, 12b, and 12c of the second cover 12 form part of the enclosure forming the sound space 100. However, the invention is not limited to such a configuration. For example, although not shown in the drawings, if the speaker 30 is centered between two opposite edges of the first cover 11, a plurality of inner walls in the shape of a rib similar to the inner wall 12d shown in FIG. 4 can be provided to form part of the enclosure forming the sound space 100 around the speaker 30.

Figure 6:
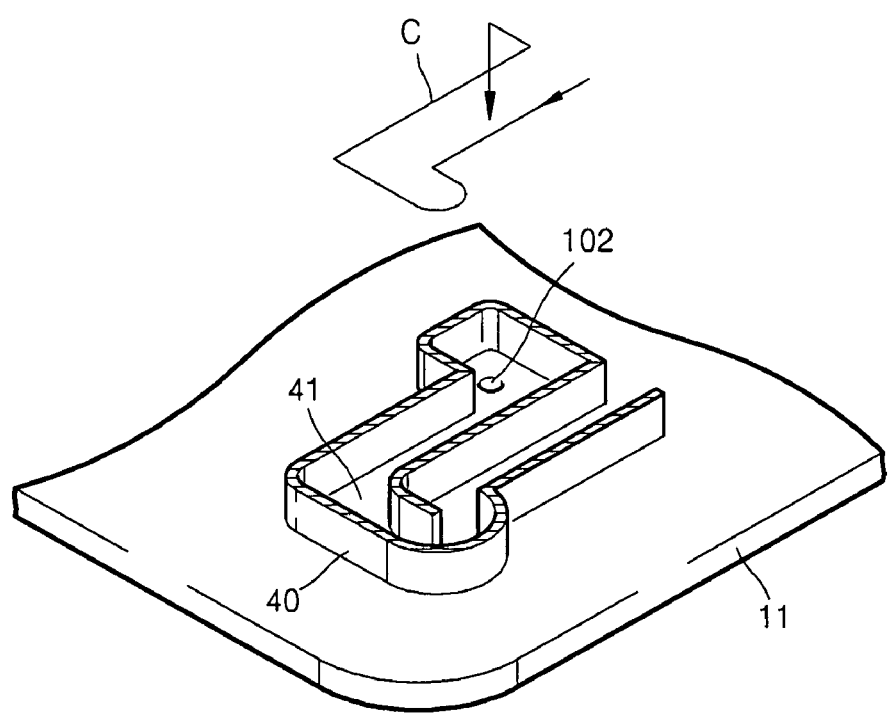
FIG. 6 is a cutaway perspective view of a sound path enclosure shown in FIG. 4 according to an aspect of the invention.

The front sound of the speaker 30 is emitted through the first sound emitting port 101. A sound path enclosure 40 is provided in the sound space 100 as shown in FIG. 4. FIG. 6 is a cutaway perspective view of the sound path enclosure in 40 in FIG. 4 according to an aspect of the invention. The sound path enclosure 40 encloses a sound path 41 as shown in FIG. 6. The rear sound of the speaker 30 passes through the sound path 41 and is emitted through the second sound emitting port 102 as shown by arrow C in FIG. 6. In a mobile apparatus according to an aspect of the invention having the structure described above, since the sound emitted from the speaker 30 is not dispersed in the main body 1, but is emitted only through the first and second sound emitting ports 101 and 102, the audio performance of the mobile apparatus according to an aspect of the invention can be enhanced.

Referring to FIGS. 4 and 5, reference numeral 31 denotes a signal line for driving the speaker 30. The signal line 31 must be connected to a control board (not shown) installed outside the sound space 100 but inside the main body 1. To this end, an opening 210 is provided in the inner wall 12d forming part of the enclosure forming the sound space 100. The signal line 31 is connected to the speaker 30 and extends out of the sound space 100 through the opening 210 so that the signal line 31 can be connected to the control board. To prevent the rear sound from leaking out through the opening 210, the opening 210 must be sealed. To this end, the mobile apparatus includes an opening sealing member 130. The opening sealing member 130 is inserted into the opening 210. The opening sealing member 130 is preferably made of an elastic material such as rubber or the like. A through hole 131 is provided in the opening sealing member 130 so that the signal line 31 can pass through the through hole 131. The signal line 31 is inserted into the through hole 131, and the opening sealing member 130 is inserted into the opening 210.

The through hole 131 has a diameter that is not larger than a diameter of the signal line 31 so that the signal line 31 can pass through the through hole 131 without leaving any gap between the signal line 31 and the opening sealing member 130. If the opening sealing member 130 is made of an elastic material, the diameter of the through hole 131 may be smaller than the diameter of the signal line 31 because the through hole 131 will stretch to accommodate the signal line 31 so that the signal line 31 can pass through the through hole 131 without leaving any gap between the signal line 31 and the opening sealing member 130.

A procedure of joining the first and second covers 11 and 12 to each other will now be briefly described. The signal line 31 is connected to the speaker 30. Next, the opening sealing member 130 is fitted on the signal line 31. Next, the speaker 30 with the signal line 31 connected thereto is positioned on the first cover 11. Next, the signal line 31 is connected to the control board (not shown) which is mounted on the first cover 11. Next, opening sealing member 130 is positioned on the first cover 11. Next, the second cover 12 is pressed downwards to join the second cover 12 to the first cover 11. As this is being done, the opening sealing member 130 is inserted into the opening 210. To this end, the opening 210 has the form of a slot opening toward the opening sealing member 130. It is preferable that an upper portion 132 of the opening sealing member 130 engaging with the opening 210 has a round shape so that the opening sealing member 130 can be inserted into the opening 210 smoothly as the second cover 12 is being joined to the first cover 11. In addition, to prevent the rear sound from leaking out of the opening 210 around the opening sealing member 130, it is preferable that an upper portion 211 of the opening 210 has a round shape corresponding to the round shape of the upper portion 132 of the opening sealing member 130.

In a mobile apparatus according to an aspect of the invention having the structure descried above, since leakage of the rear sound of the speaker 30 outside the sound space 100 through the opening 210 for the signal line 31 is prevented by the opening sealing member 130, the audio performance of the mobile apparatus can be enhanced.

Referring again to FIGS. 4 and 5, the mobile apparatus further includes a first sealing member 110 for sealing gaps between the first cover 11 and the walls 12a, 12b, 12c, and 12d to enhance sealing performance of the sound space 100. The first sealing member 110 is preferably made of an elastic material such as rubber or the like.

In addition, to enhance the capability of sealing the sound space 100, the mobile apparatus further includes a second sealing member 120 for sealing gaps between the first cover 11 and the speaker 30. The second sealing member 120 is preferably made of an elastic material such as rubber or the like.

The first sealing member 110 may have the shape of a strip surrounding the speaker 30 conforming to the configuration of the walls 12a, 12b, 12c, and 12d. The second sealing member 120 may have an annular shape having a through hole at the center portion so that the front sound of the speaker 30 can be emitted through the first sound emitting port 101, Although the sealing member 120 may be flat, it is preferable that the second sealing member 120 have a flat annular portion interposed between the first cover 11 and the speaker 30, and a collar portion connected to the flat annular portion and surrounding and contacting a portion of the side or circumferential surface of the speaker 30 as shown in FIG. 4. When joining the first and second covers 11 and 12 to each other, the second sealing member 120 is placed on the first sound emitting port 101 of the first cover 11, and then the speaker 30 is placed on the second sealing member 120. Then, signal line 31 is connected to the control board. Then, the first sealing member 110 is placed on the first cover 11. Then, the opening sealing member 130 is placed at a point on the first cover 11 corresponding to the opening 210. Then, the second cover 12 is pressed downwards and is joined to the first cover 11 so that the first sealing member 110 is interposed between the walls 12a, 12b, 12c, and 12d and the first cover 11. As this is being done, the opening sealing member 130 is inserted into the opening 210. When the second cover 12 is joined to the first cover 11, a pressing rib or ribs (not shown in the drawings) formed inside the second cover 12 on the back 12e of the second cover 12 press the speaker 30 against the second sealing member 120, thereby compressing the second sealing member 120. The compressed second sealing member 120 exerts a reactive force on the second sealing member 120 that presses the speaker 30 against the second cover 12. This structure enables the speaker 30 to be fixed in the sound space 100 without requiring a separate fastening device to fix the speaker 30 in the sound space 100. In addition, although not shown in the drawings, the speaker 30 may be attached to the first cover 11 with a fastening device. The structure described above provides a mobile apparatus according to an aspect of the invention with the sealed sound space 100 having the first and second sound emitting ports 101 and 102.

In contrast to conventional mobile apparatuses in which a sound space is sealed by sealing gaps of the sound space with a sealing agent, and a main body is assembled after the sealing agent has completely cured, in a mobile apparatus according to an aspect of the invention, the sound space 100 is sealed by interposing the second sealing member 120 between the speaker 30 and the first cover 11 when the speaker 30 is joined to the first cover 11, and by interposing the first sealing member 110 between the first and second covers 11 and 12 when the second cover 12 is joined to the first cover 11. Therefore, the process of assembling a mobile apparatus according to an aspect of the invention is simpler than the process of assembling the conventional mobile apparatuses, and a high quality seal can be achieved in a mobile apparatus according to an aspect of the invention.

Figure 7:
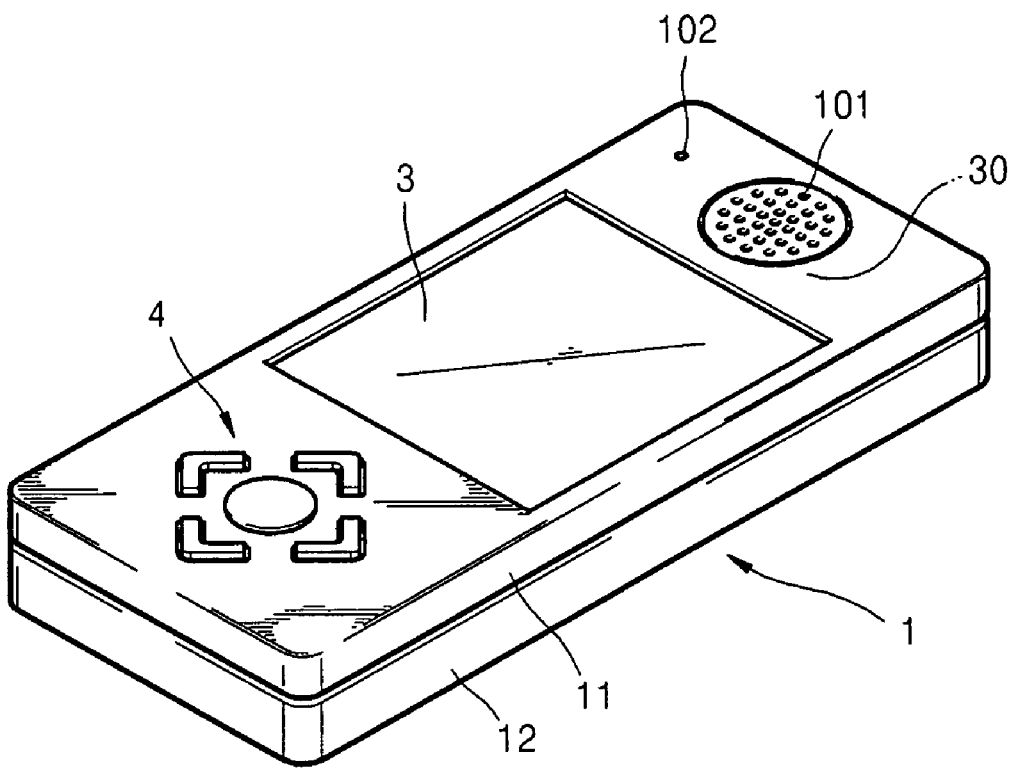
FIG. 7 is a perspective view of a mobile apparatus according to another aspect of the invention.

The technique of sealing the sound space 100 according to an aspect of the invention described above can be applied not only to the mobile apparatus having the main body 1 and the movable body 2, but also to another type of mobile apparatus that does not have a movable body 2 and in which a speaker 30, a display unit 3, and an operation unit 4 are installed in a main body 1 as shown in FIG. 7. In addition, the invention can be applied to any type of mobile apparatus employing a speaker 30 such as gaming devices, communication terminals, or multimedia apparatuses for reproducing audio information, or video and audio information.

As described above, in a mobile apparatus according to an aspect of the invention, audio performance of the mobile apparatus can be enhanced by effectively sealing the sound space in which the speaker is installed. In addition, a mobile apparatus in which the sound space can be sealed effectively using a very simple assembly process can be realized.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A mobile apparatus comprising:
a first cover;
a speaker;
a second cover joined to the first cover and comprising a plurality of walls and a back, the plurality of walls and the back forming a sound space around the speaker together with the first cover; and
a first sealing member interposed between the first cover and the plurality of walls to seal gaps between the first cover and the plurality of walls,
wherein one of the plurality of walls comprises an opening therein comprising a slot comprising a closed end and an open end opening toward the first cover, wherein the mobile apparatus further comprises:
  a signal line connected to the speaker and passing through the opening in the one of the plurality of walls; and
  an opening sealing member that seals the opening in the one of the plurality of walls through which the signal line passes,
wherein the opening sealing member has a through hole therein,
wherein the signal line passes through the through hole in the opening sealing member without leaving any gap between the signal line and the opening sealing member,
wherein the opening sealing member is disposed in the opening in the one of the plurality of walls,
wherein during assembly of the mobile apparatus, the opening sealing member is positioned on the first cover, the second cover is joined to the first cover, and the opening sealing member is inserted into the slot as the second cover is being joined to the first cover,
wherein the opening sealing member comprises a rounded portion contacting the closed end of the slot, and
wherein the closed end of the slot has a rounded shape matching a shape of the rounded portion of the opening sealing member contacting the closed end of the slot.

2. The mobile apparatus of claim 1, further comprising a second sealing member interposed between the speaker and the first cover to seal gaps between the speaker and the first cover.

3. The mobile apparatus of claim 1, further comprising:
  a first sound emitting port that emits front sound of the speaker and is provided in the first cover; and
  a second sound emitting port that emits rear sound of the speaker and is provided in the first cover.

4. The mobile apparatus of claim 3, further comprising a sound path enclosure that provides a sound path between the sound space and the second sound emitting port.

5. A mobile apparatus comprising:
  a main body comprising:
    a first cover; and
    a second cover joined to the first cover and comprising a back and a plurality of walls;
  an enclosure forming a sound space in the main body, wherein the enclosure is formed by the first cover, the plurality of walls of the second cover, and the back of the second cover;
  a speaker disposed in the sound space;
  a first sound emitting port that communicates with the sound space and emits front sound of the speaker; and
  a second sound emitting port that communicates with the sound space and emits rear sound of the speaker,
wherein the enclosure comprises an opening therein comprising a slot in one of the walls, and
wherein the sound space is completely sealed by a pressure of joining the second cover to the first cover without using a curable sealing agent except where the sound space communicates with the first sound emitting port and the second sound emitting port.

6. The mobile apparatus of claim 5,
wherein the mobile apparatus further comprises:
  a signal wire connected to the speaker and passing through the opening in the enclosure; and
  an opening sealing member that seals the opening in the enclosure through which the signal wire passes.

7. The mobile apparatus of claim 6, wherein the opening sealing member is an elastic member.

8. The mobile apparatus of claim 6, wherein the opening sealing member has a through hole therein;
wherein the signal wire passes through the through hole in the opening sealing member without leaving any gap between the signal line and the opening sealing member; and
wherein the opening sealing member is disposed in the opening in the enclosure, thereby sealing the opening in the enclosure.

9. The mobile apparatus of claim 8,
wherein the slot comprises a closed end and an open end opening toward the first cover,
wherein the opening sealing member comprises a rounded portion contacting the closed end of the slot, and
wherein the closed end of the slot comprises a rounded shape matching a shape of the rounded portion of the opening sealing member contacting the closed end of the slot.

10. The mobile apparatus of claim 5, wherein the first sound emitting port and the second sound emitting port are provided in the first cover.

11. The mobile apparatus of claim 5, further comprising a first sealing member interposed between the first cover and the plurality of walls to seal gaps between the first cover and the plurality of walls.

12. The mobile apparatus of claim 11, wherein the first sealing member comprises an elastic member.

13. The mobile apparatus of claim 11, wherein the first sealing member comprises a strip member conforming to a configuration of the plurality of walls.

14. The mobile apparatus of claim 11, wherein the mobile apparatus further comprises a second sealing member interposed between the speaker and the first cover for sealing gaps between the speaker and the first cover.

15. The mobile apparatus of claim 14, wherein the second sealing member comprises:
  a flat annular portion interposed between the speaker and the first cover; and
  a collar portion connected to the flat annular portion and surrounding and contacting a portion of a side surface of the speaker.

16. The mobile apparatus of claim 14, wherein the second sealing member comprises an elastic member;
wherein the back of the second cover presses the speaker against the second sealing member, thereby compressing the second sealing member between the speaker and the first cover; and
wherein the compressed second sealing member exerts a reactive force on the speaker that presses the speaker against the second cover, thereby fixing the speaker in place in the sound space.

17. The mobile apparatus of claim 5, further comprising a sound path enclosure that provides a sound path between the sound space and the second sound emitting port.

18. A method of assembling a mobile apparatus comprising a sealed sound space, the method comprising:
  fitting an opening sealing member on a signal line, the signal line being connected to a speaker;
  positioning the speaker on a first cover;
  positioning the opening sealing member on the first cover;
  pressing a second cover to the first cover; and
  joining the second cover to the first cover,
wherein the second cover comprises an opening into which the opening sealing member is thereby fitted,
wherein the second cover and the first cover together comprise the sound space, wherein the speaker is disposed within the sound space, wherein the speaker is held in place by the first and second covers and is not in contact with the opening sealing member, wherein the opening comprises a slot opening towards the opening sealing member, and wherein an upper portion of the opening sealing member comprises a round shape and an upper portion of the opening comprises a corresponding round shape such that the opening sealing member fits in the slot without gaps therebetween.

19. The method of claim 18, wherein the mobile apparatus comprises a first sealing member for sealing gaps between the first cover and the second cover, together with the opening sealing member thereby sealing the sound space.

20. The method of claim 19, wherein the first sealing member comprises an elastic material.

21. The method of claim 19, wherein the first sealing member comprises a form of a strip.

22. The method of claim 18, further comprising disposing the speaker at a location of a sound emitting opening in the first cover, wherein the mobile apparatus comprises a second sealing member for sealing gaps between the first cover and the speaker.

23. The method of claim 22, wherein the second sealing member comprises an elastic material.

24. The method of claim 23, wherein the second cover presses the speaker against the second sealing member and thereby compresses the second sealing member and fixes the speaker in the sound space.

25. The method of claim 22, wherein the second sealing member comprises a form of an annular shape comprising a through hole at a center portion thereof, the through hole being positioned at the sound emitting opening in the first cover.

26. The method of claim 22, wherein the second sealing member comprises a flat annular portion interposed between the first cover and the speaker, and a collar portion connected to the flat annular portion and surrounding and contacting a portion of a side or circumferential surface of the speaker.

* * * * *